(12) United States Patent
Malwankar et al.

(10) Patent No.: US 8,175,085 B2
(45) Date of Patent: May 8, 2012

(54) BUS SCALING DEVICE

(75) Inventors: Kiron Malwankar, Saratoga, CA (US); Daniel Talayco, Mountain View, CA (US)

(73) Assignee: Fusion-io, Inc., Salt Lake City, UT (US)

( * ) Notice: Subject to any disclaimer, the term of this patent is extended or adjusted under 35 U.S.C. 154(b) by 0 days.

(21) Appl. No.: 12/353,659

(22) Filed: Jan. 14, 2009

(65) Prior Publication Data

US 2009/0245245 A1  Oct. 1, 2009

Related U.S. Application Data (60) Provisional application No. 61/039,321, filed on Mar. 25, 2008.

(51) Int. Cl.
*H04L 12/50* (2006.01)
*H04Q 11/00* (2006.01)
*G06F 13/00* (2006.01)
*G06F 13/14* (2006.01)

(52) U.S. Cl. ........ 370/357; 370/359; 370/360; 370/362; 370/366; 370/412; 370/413; 370/414; 370/415; 370/416; 370/417; 370/418; 710/8; 710/27; 710/107; 710/305

(58) Field of Classification Search .................. 370/217, 370/357, 359, 360, 362, 366, 388, 402, 412–418; 398/60; 710/8, 15, 27, 62, 300, 107–125, 710/305, 317; 709/8, 15, 27, 62, 300, 107–125, 709/305, 317

See application file for complete search history.

(56) References Cited

U.S. PATENT DOCUMENTS

| | | | | |
|---|---|---|---|---|
| 6,525,742 | B2 * | 2/2003 | Nonomura et al. | 345/603 |
| 7,027,442 | B2 * | 4/2006 | Shirakawa et al. | 370/392 |
| 7,051,150 | B2 * | 5/2006 | Naumann et al. | 710/317 |
| 7,212,528 | B2 * | 5/2007 | Kuhl et al | 370/389 |
| 7,286,570 | B2 * | 10/2007 | Kendall et al. | 370/535 |
| 7,324,541 | B2 * | 1/2008 | Muthukrishnan et al. | 370/429 |
| 7,349,407 | B1 * | 3/2008 | Takamatsuya et al. | 370/395.5 |
| 7,613,183 | B1 * | 11/2009 | Brewer et al. | 370/392 |
| 7,668,161 | B2 * | 2/2010 | Morgan et al. | 370/389 |
| 7,676,625 | B2 * | 3/2010 | Cassiday et al. | 710/316 |
| 2003/0043850 | A1 * | 3/2003 | Kobayashi | 370/474 |
| 2005/0102454 | A1 * | 5/2005 | McAfee et al. | 710/107 |
| 2005/0207436 | A1 * | 9/2005 | Varma | 370/412 |
| 2007/0285712 | A1 * | 12/2007 | Komada | 358/1.15 |
| 2008/0279195 | A1 * | 11/2008 | Okuno | 370/395.6 |
| 2009/0245245 | A1 * | 10/2009 | Malwankar et al. | 370/389 |

* cited by examiner

*Primary Examiner* — Kwang B Yao
*Assistant Examiner* — Benjamin H Elliott, IV (57) ABSTRACT

A scaling device or striper improves the lane efficiency of switch fabric. The striper controls or adjusts transfer modes and payload sizes of a large variety of devices operating with different protocols. The striper interfaces between network devices and the switch fabric, and the resulting switching system is configurable by a single controller. A source device sends a data packet to its corresponding striper for transmission across the switch fabric to a destination device. The corresponding striper parses the packet to determine its type and payload length, and divides the packet into numerous smaller segments when the payload length exceeds a predetermined length. The segments may be stored in the striper to adapt to the available bandwidth of the switch. The segments are sent across the switch fabric and reassembled at a destination striper. The packet as reassembled is forwarded to the destination device.

45 Claims, 7 Drawing Sheets

BUS SCALING DEVICE

RELATED APPLICATION

This application claims the benefit of U.S. Patent Application No. 61/039,321, filed Mar. 25, 2008.

TECHNICAL FIELD

The disclosure herein relates generally to network architectures. In particular, this disclosure relates to the lane efficiency of network switch fabric.

BACKGROUND

A conventional Peripheral Component Interconnect (PCI) bus is a local parallel bus that allows peripheral cards to be added into a single computer system. Examples of commercially available peripheral cards with a PCI bus interface are SCSI (data storage) cards, wireless LAN add-in cards, digital TV tuner add-in cards, USB, FireWire 1394 controllers, Gigabit Ethernet (GbE) add-in cards, etc. The PCI bus communicates with a single CPU or multiple CPUs of the computer system through a PCI-bridge controller. Several PCI bridges may exist in a computer system and couple a diversity of input/output (I/O) devices with the single CPU or multiple CPUs of the computer system.

Figure 9:
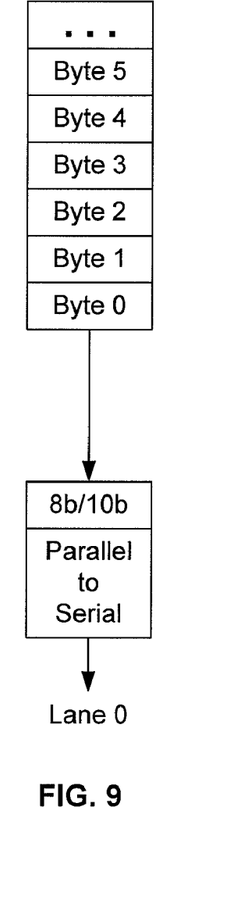
FIG. 9 shows a data transmission scheme in a PCIe link having one lane, under the prior art.

A PCI-Express (PCIe) is a modification of the conventional PCI bus. Rather than the shared, parallel bus structure, PCIE uses a point-to-point high-speed switched architecture. Each PCIE link is a serial communications channel between two devices. The bandwidth of a PCIE link may be linearly scaled by adding signal pairs to form multiple lanes. A lane is defined as two unidirectional differential pairs that provide 2.5 Giga transfers per second per direction (GTps), 5.0 GTps or 8.0 GTps in each direction. Up to 32 of these lanes may be combined in x2, x4, x8, x16 and x32 configurations, creating a parallel interface of independently controlled serial links. Connections between PCIe I/O devices are made through ports. Ports are connected through the scalable serial link. Each byte (8 bits) is transmitted, with 8b/10b encoding and parallel-to-serial conversion, across one lane. The characteristics of the PCIE port and the lane data transfer rates are in compliance with PCI-Express Base Specification standardized by PCI-SIG. FIG. 9 shows a data transmission scheme in a PCIe link having one lane.

The PCIe architecture is organized in layers. Packets are initiated at the transaction layer. The transaction layer receives read and write requests from the software layer and creates packets for transmission to the link layer. Each packet has a unique identifier (source ID) that enables response packets to be directed to the correct originator. The packet format supports 32-bit memory addressing and extended 64-bit memory addressing. The link layer is responsible for data integrity and adds a sequence number and a cyclic redundancy check (CRC) to the transaction layer.

The PCIe architecture allows the interconnection of multiple devices to each other. The device that provides this connectivity is called a switch. A switch may contain several ports. A bridge is a switch that contains only two ports. Throughout this specification, the term switch includes both switches and bridges. A switch is called non-blocking when devices connected to it can communicate with each other at their full physical transfer rate. A switch is called blocking when devices cannot communicate at their full physical transfer rate across the switch. Commercially available PCIe switches support 24-lane 3 ports and 48-lane 12 ports, respectively, for example.

The PCIe switches may be connected to each other to provide increased connection capability in order to accommodate more devices. An ensemble of interconnected switches is defined as a switch fabric, which contains multiple ports for connecting upstream devices such as root complexes (CPUs with memories) and downstream devices such as add-ins, high-performance I/O devices. The term switch and switch fabric will be used alternatively hereinafter as they mean a switching structure providing physical ports and logic to forward data between devices, which are connected to the ports.

Many communications and networking applications such as Gigabit Ethernet (GbE), 10 Gigabit (Gb) Ethernet, Fibre Channel, and InfiniBand require higher bandwidth I/O. Switches must be scalable to adapt to the increased need in bandwidth. Bandwidth is defined as the rate at which data are moved across a physical connection. For example, the bandwidth of a GbE is 1,000 Mbps, and the bandwidth of a 10 Gb Ethernet is 10,000 Mbps. A PCIe x4 port provides an aggregate bandwidth of 10 Gbps over four full-duplex point-to-point connection (1 physical connector) running at 2.5 Gbps per lane.

In order to adapt to a large variety of applications, where some are time sensitive or time critical such as real-time audio processing or video compression/decompression and distribution, a data communication or computing server system must have scalable capability. And switches are often a limiting factor in the ability for communications or networking systems to scale, i.e., connections cannot be easily added to support increasing demand in bandwidth.

Figure 10:
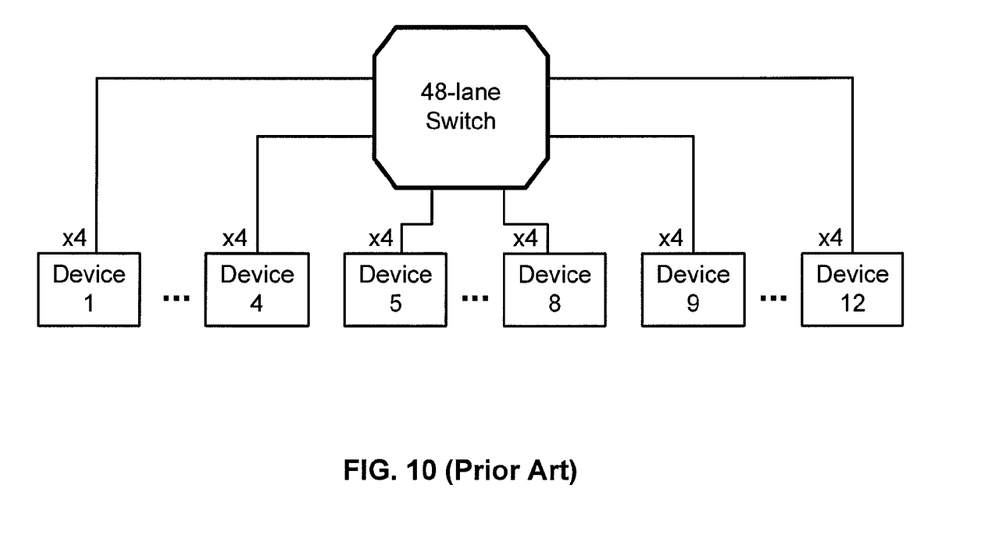
FIG. 10 shows a conventional switching structure in which 12 devices (servers or end-points) are connected to a 48-lane switch, each with a x4 port, under the prior art.

FIG. 10 shows a conventional switching structure in which 12 devices (servers or end-points) are connected to a 48-lane switch, each with a x4 port. Switches typically support 48 lanes, and connections to servers or endpoint are typically x4 ports. The lane efficiency, which is the ratio of the number of lanes that connect to end-points or servers to the number of lanes on all switches in the system, is a measure of the utilization of the switches in the system. The lane efficiency of this conventional system having one 48-lane switch is 1.0, for example, since all ports on the switch connect to endpoints or servers.

Figure 11:
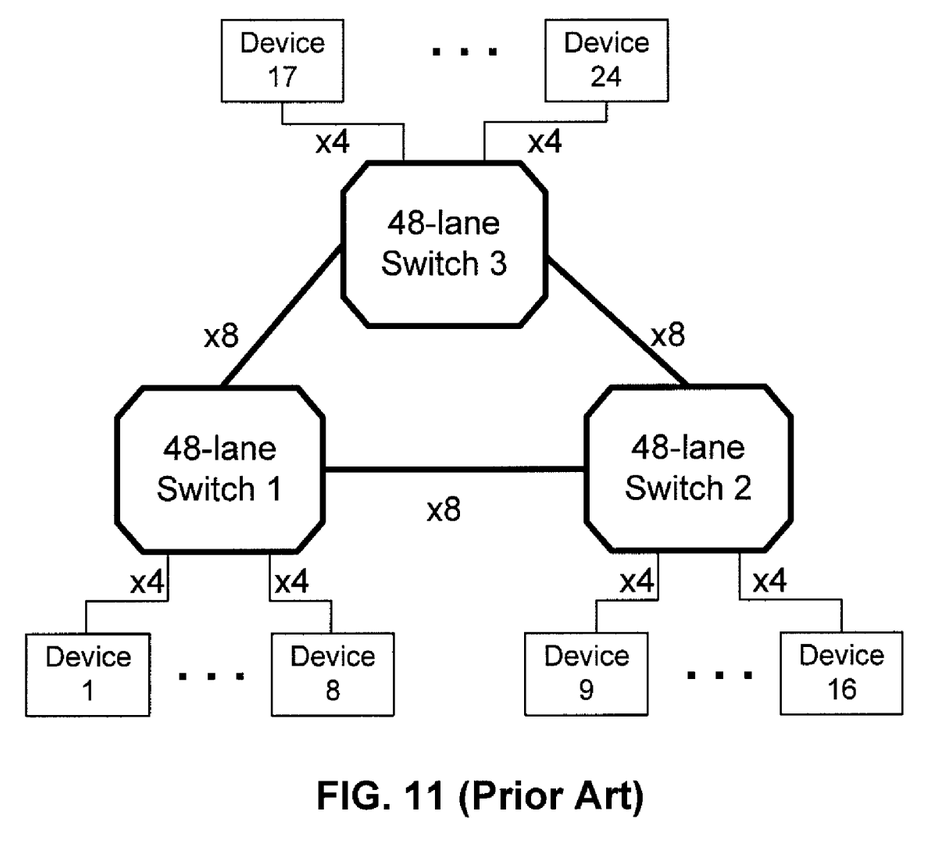
FIG. 11 shows a configuration of three 48-lane switches connected together to enable connection of 24 devices, under the prior art.

FIG. 11 shows another conventional configuration of three 48-lane switches connected together to enable connection of 24 devices. In this example, three 48-lane switches are used, and the switches are interconnected with x8 ports in a mesh pattern allowing 24 devices to be interconnected to each other, each device having a x4 port. The lane efficiency of this system is (24 devices×4 lanes/device)/(3 switches×48 lanes/switch) or 96/144=0.67. However, this configuration is blocking, meaning that it is unable to transfer traffic from end to end at the fullest possible bandwidth. For example, if three devices connected to Switch 1 attempt to send data to three devices connected to Switch 3, the required bandwidth is 12 lanes of data, but only 8 lanes connect the two switches.

In order for this blocking structure to become non-blocking, three additional 48-lane switches have to be added, for a total of six switches. The six switches are organized in two cross-coupled layers, with two switches in the upper layer and four switches in the lower layer (FIG. 12). Each lower-layer switch connect to each of the upper-layer switches with a x12 port. The resulting efficiency of switch lane use is (24 devices×4 lanes/device)/(6 switches×48 lanes/switch) or 96/288=0.33.

INCORPORATION BY REFERENCE

Each patent, patent application, and/or publication mentioned in this specification is herein incorporated by reference in its entirety to the same extent as if each individual patent, patent application, and/or publication was specifically and individually indicated to be incorporated by reference.

DETAILED DESCRIPTION

Embodiments are described that use data segmentation and reassembly to overcome relatively low lane efficiency in conventional switching architectures. A scaling device is described herein that improves the lane efficiency of existing PCIe switch fabric. The scaling device, also referred to herein as a striper, interfaces between PCIe devices and the switch fabric, and controls or adjusts transfer modes and payload sizes of a large variety of devices operating on different I/O transmission protocols. The complete switching system, including the striper, is configurable by a single controller.

In operation, a source device sends a data packet to its corresponding striper for transmission across the switch fabric to a destination device. The associated striper parses the packet to determine its type and payload length, and divides the packet into small packet pieces or segments, wherein each packet piece contains at least the source device identifier (ID), the destination device ID or 32-bit and extended 64-bit addresses depending on the packet type, and a portion of data payload. The pieces are sent across the switch fabric and reassembled at a destination striper. The assembled packet is forwarded to the destination device.

Embodiments described herein further provide a method of transmitting data packets across a switch fabric with high lane efficiency. The method comprises placing a striper between each PCIe device and the switch fabric. The striper parses data packets to determine their type and payload length, and splits packets with payload length that exceeds a predetermined number of bytes into smaller packets. The small packets are then routed across the switch fabric and reassembled at a destination striper, which is coupled to a destination device. The assembled packet is then sent to the destination device. The destination striper can start transmitting partially assembled packet to the destination device to reduce latency.

In the following description, numerous specific details are introduced to provide a thorough understanding of, and enabling description for, embodiments of the present invention. One skilled in the relevant art, however, will recognize that these embodiments can be practiced without one or more of the specific details, or with other components, systems, etc. In other instances, well-known structures or operations are not shown, or are not described in detail, to avoid obscuring aspects of the disclosed embodiments.

The embodiments described herein are described in the context of a PCIe switch fabric; however the embodiments are not limited to PCIe switch fabric. The striper device and striping methods described herein can be applied to any switching structures that support scalable physical links and, as such, are not limited to a PCIe physical specification.

The devices described herein, which are coupled to switches via the striper can include any electronic device that couples to a network switch. The devices include, but are not limited to, servers, root complexes, I/O adapters such as Ethernet controllers coupled to a local area network (LAN), Fibre Channel host bus adapters coupled to a storage area network, InfiniBand host channel adapters coupled to other switches or servers, high-performance graphics controllers, video-on-demand distribution units and other high-speed peripherals such as serial ATA (SATA), iSCSI and others, to name a few.

Figure 1:
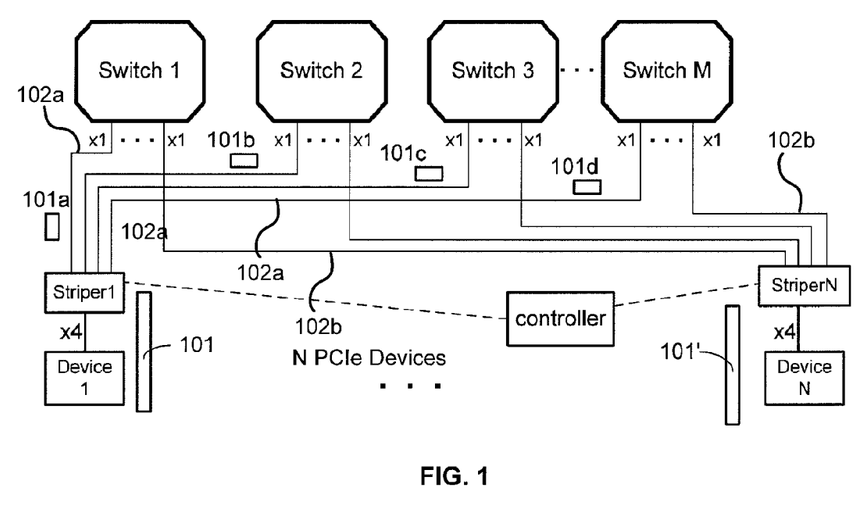
FIG. 1 shows a switching configuration that uses stripers for coupling switches and devices, under an embodiment.

Embodiments herein provide relatively higher lane efficiency in part by splitting a x4 port data transfer into four x1 lane traffic, for example. An embodiment is directed to a scaling device comprising a port connected to a device and a plurality of lanes connected to the switch fabric. FIG. 1 shows a switching configuration that uses stripers for coupling switches and devices, under an embodiment. The switching configuration using the stripers for connecting switches and devices is non-blocking. The stripers are coupled to a controller. Between each device and the switch fabric, the striper parses transmitted packets to identify their types and splits the packets into smaller packet pieces according to the number of available lanes coupled to the switch. Each of the striped segments of the data packet is forwarded by the respective switch to a destination striper, which is coupled to a destination PCIe device. The destination striper reassembles the pieces and sends the reassembled packet on to the destination PCIe device.

The configuration of this example uses M switches (where M is any number equal to or greater than two (2)) for connecting N devices (where N is any number equal to or greater than two (2)), but the embodiment is not so limited. Between each device and the switch fabric, a striper parses transmitted packets to identify their types and splits the packets into smaller packet pieces according to the number of available lanes coupled to the switch.

As an example, consider a configuration which includes four (4) stripers coupled to four(4) switches (shown in FIG. 1 where M equals 4 and N equals 4). The four (M is 4) switches of this non-blocking switching configuration are not directly interconnected. A striper 100 is placed between each device and the switch. Coupling to the switches is achieved by the interface lanes 102. When a Striper 1 receives a packet 101 from an associated Endpoint Device 1, it parses the header field to determine the packet type and payload length. In one embodiment, if the payload length exceeds a predetermined value, Striper 1 segments the packet into four smaller packet segments 101 a-d and forwards them to the four switches via the lanes 102 which are attached to striper 1, namely the attached lanes 102a. Striper 4 (N is 4) receives the segmented packets 101 a-d from the lanes 102 which are attached to striper 4 by the attached lanes 102b and reassembles the segmented packets to form a reassembled packet 101' and transmits the reassembled packet to Device4 (N is 4). Each of the packet segments 101a to 101d may have the PCIe packet frame format described herein. The packet segments 101a-d of the depicted embodiment are sent to or transmitted simultaneously using all available lanes namely each attached lane 102a and 102b, but the embodiment is not limited to simultaneous transfer. However, there are cases that one switch is busy or does not have the same bandwidth as the others, the affected packet piece must be stored temporarily in the striper, as described in detail below.

Figure 2:
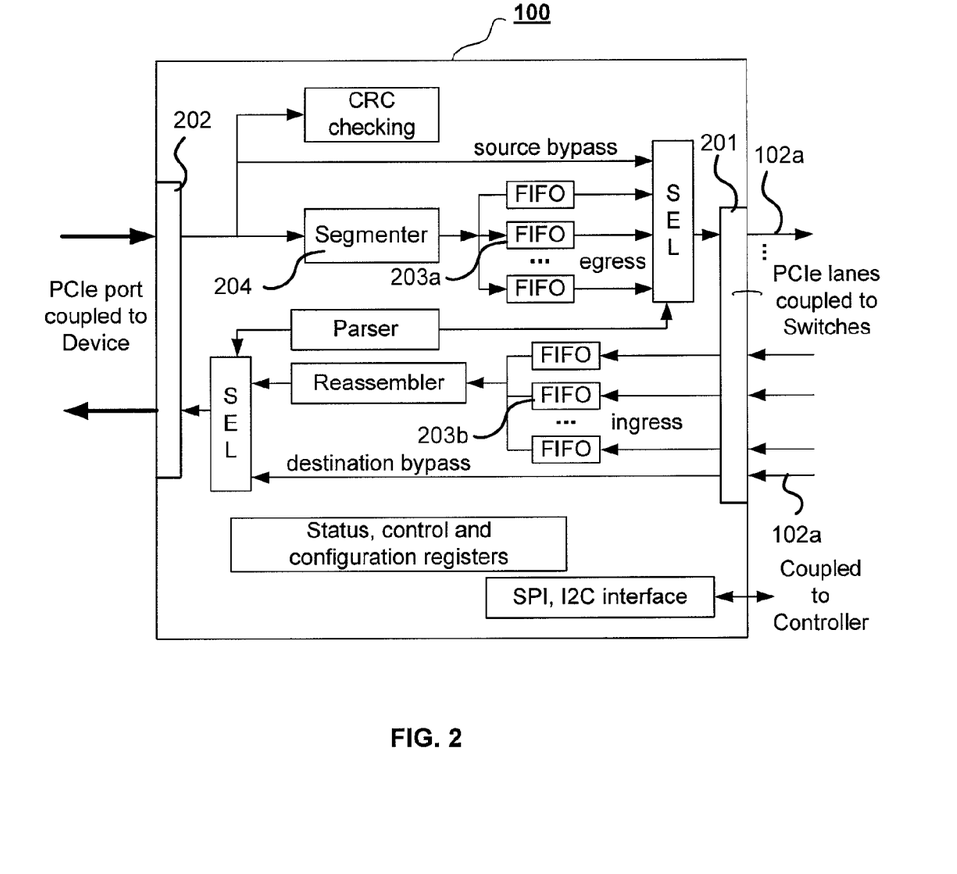
FIG. 2 is a block diagram of a striper, under an embodiment.

FIG. 2 is a block diagram of a striper 100, under an embodiment. The striper 100 is adapted to perform packet segmentation-and-reassembly and store-and-forward. The striper 100 includes a Parser that analyzes the header field of a packet received from a source (i.e. endpoint) device via an endpoint port 201 in order to determine the packet type, the payload length and other relevant information. The packet type may be a 32-bit, 64-bit addressable request packet, a configuration request packet, or a completion packet. The payload length is compared with a predetermined value. The predetermined value may be programmable through an SPI of I2C interface. Based on the type and the length of the payload, the Parser may instruct the Segmenter 204 to divide the received packet into smaller packet segments and distribute them for storage in the Egress FIFOs. The Parser may also select which stored packet segments will be sent first to the switch fabric via the fabric ports 202 and the attached lanes 102a. The packet received from the source (i.e. endpoint) device may bypass the segmentation process if its payload is less than a predetermined number of bytes. The bypass path 203 is shown as a line above the Segmenter 204. A CRC checking circuit may verify the validity of the received packet to ensure that only error-free packets will be segmented and stored in egress FIFOs, or only error-free packets will be forwarded to the switch fabric.

The depicted striper 100 also includes multiple Ingress FIFOs that stores packet segments arriving from the switch fabric via the attached lanes 102a. The parser may analyze the packet type and decide whether only fully assembled or partially assembled packets are forwarded to the destination device. The Reassembler can be bypassed and packets coming from the switch fabric can be directly forwarded to the destination device. The bypass path 204 is shown as a line below the Ingress FIFOs and the Reassembler. The striper 100 also includes status, control and configuration registers. The programming and read/write of the registers may be performed through an external controller (not shown) via an SPI (serial peripheral interface) or an I2C interface.

Figure 3:
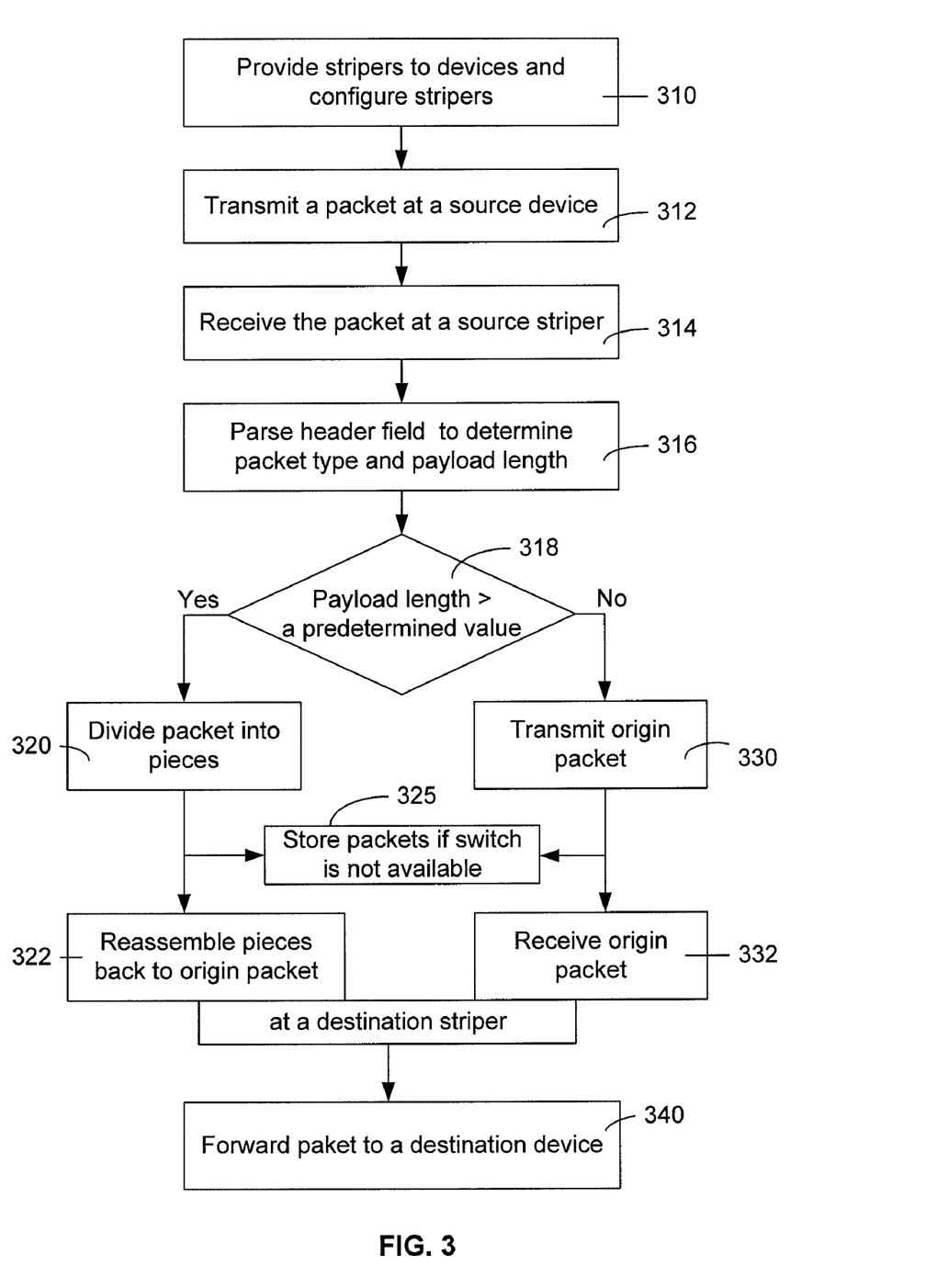
FIG. 3 is a flow diagram for packet transmission using stripers, under an embodiment.

FIG. 3 is a flow diagram for packet transmission using stripers, under an embodiment. At striper is coupled or connected to each device in a switch fabric and the striper is configured 310 according to the available bandwidth of the switch fabric. A source (request) device transmits 312 a packet to a destination device. The packet is received 314 at an associated striper, and the received packet is parsed 316 for its type, the payload length and other relevant information. The striper determines 318 the payload length of the receiver packet by comparing it with a predetermined value.

When the comparison determines the payload length is less than a predetermined value, the source striper directly forwards 330 the original packet without segmentation. Packets may be stored 325 if the source striper notices that the switch fabric is temporarily unavailable or has insufficient bandwidth. The original un-fragmented packet is received 332 at a destination striper, and the destination striper in turn forwards 340 the packet to the destination device.

When the comparison determines the payload length is greater than a predetermined value, the source striper segments 320 the packet into smaller packet pieces. Packets may be stored 325 if the source striper notices that the switch fabric is temporarily unavailable or has insufficient bandwidth. Transmitted packet pieces are received at a destination striper, and the destination striper reassembles 322 the pieces back to the origin or original packet. The destination striper transmits or transfers 340 the reassembled packet to the destination device. The forwarding of packets may start prior to completion of packet reception in order to reduce latency.

Figure 4:
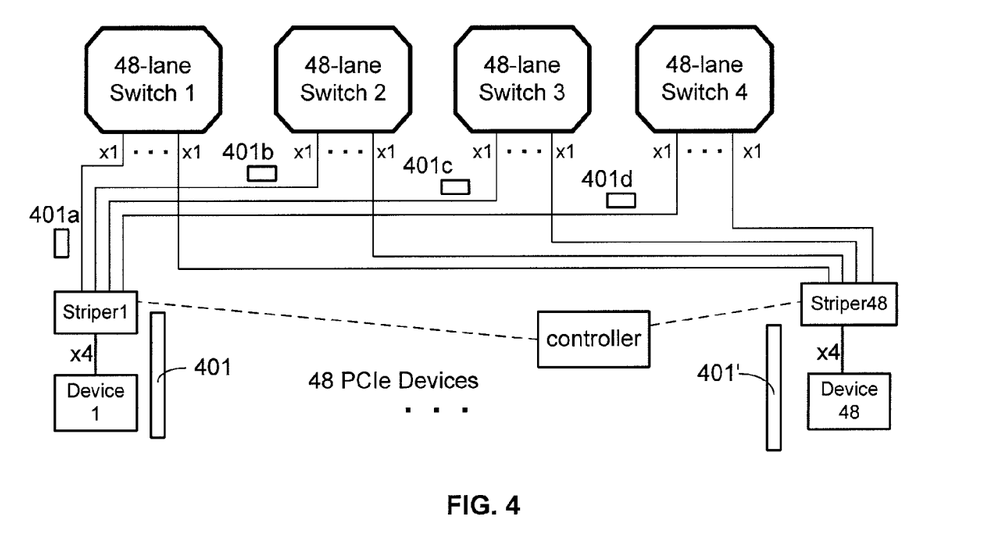
FIG. 4 shows an example switching configuration that uses stripers for coupling switches and devices, under an embodiment.

FIG. 4 shows an example switching configuration that uses stripers for coupling switches and devices, under an embodiment. The configuration of this example uses four 48-lane switches for connecting 48 devices, but the embodiment is not so limited. The switching configuration using four 48-lane switches for connecting 48 devices is non-blocking. Between each device and the switch fabric, the striper parses transmitted packets to identify their types and splits the packets into smaller packet pieces according to the number of available lanes coupled to the switch. In this example configuration, the striper connects to a PCIe device with a x4 port and connects to each switch with a x1 link. When the striper receives a data packet from the PCIe device at x4 speed, it divides the packet into small pieces or segments and sends the pieces serially to each switch, i.e., it stripes the received packet into small packet pieces.

Each of the striped segments of the data packet is forwarded by the respective switch to a destination striper, which is coupled to a destination PCIe device. The destination striper reassembles the pieces and sends the reassembled packet on the x4 port to the destination PCIe device. The lane efficiency of this architecture is (48 devices×4 lanes/device)/(4 switches×48 lanes/switch) or 192/192=1.0.

The non-blocking switching configuration of this embodiment uses four switches that are not directly interconnected. A striper is placed between each device and the switch. When striper1 receives a packet 401 from associated Device1, it parses the header field to determine the packet type and the payload length. If the payload length exceeds a predetermined value, striper1 segments the packet into four small pieces 401a-d and forwards them to the four switches. Striper48 reassembles the segmented packets 401a, 401b, 401c, and 401d back to the origin packet 401' and transmits to Device 48. Each of the pieces 401a to 401d has the PCIe packet frame format described herein with reference to FIG. 8. The pieces 401a-d are generally sent simultaneously using all available lanes.

However, there are scenarios under which one switch is busy or does not have the same bandwidth as other switches, in which case the affected packet piece is stored temporarily in the striper. For that reason, the striper includes a plurality of first-in first-out dual-port memories (FIFOs) to accommodate these cases. Egress FIFOs are dual-port data memories coupled to the fragmenter, and ingress FIFOs are dual-port data memories coupled to the reassemble, as described in detail with reference to FIG. 2.

The transmitted packet may not be broken up if its payload length is below the predetermined value. In this case, the stripers merely forward the whole packet from a source device to a destination device, and enable thus a direct end-to-end and peer-to-peer communication between devices. In one embodiment, the predetermined value is in a range of approximately 4 to 128 bytes. In another embodiment, the predetermined value is in a range of approximately 16 to 64 bytes. For example, when packet length is less than or equal to 32 bytes, the packets are not segmented (fragmented) but instead transmitted directly (e.g., they bypass the segmentation circuit). The predetermined value is programmable through a controller through a serial interface, which is preferably one of the Serial Peripheral Interface (SPI) bus interface or an I2C (Inter-Integrated Circuit) bus interface.

Figure 5:
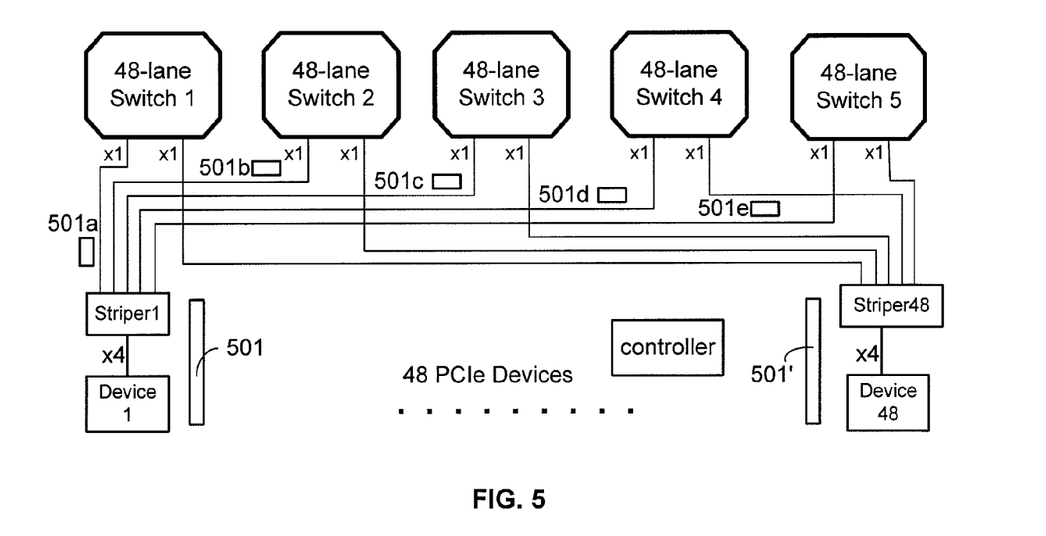
FIG. 5 shows an example switching configuration that uses stripers for coupling switches and devices, under an alternative embodiment.

FIG. 5 shows an example switching configuration that uses stripers for coupling switches and devices, under an alternative embodiment. The configuration of this example is a non-blocking switching configuration that uses five 48-lane switches. Striper 1 which is associated with device 1 may add additional information to the transmitted packet 501. The additional information (overhead) will increase the required transmission bandwidth across the switch fabric. For this reason, Switch 5 has been added to accommodate the additional information which is represented as a short packet 501e. An example of additional information may be flow control messages, the type of data frames (Ethernet, Fibre Channel, InfiniBand and others) embedded in the payload, the class of services, etc.

The striper is software programmable. The programming is performed by a controller through one of the SPI or I2C bus interface. Received packets can be left unchanged, and forwarded to the switch. The threshold of the segmentation (fragmentation) can be programmed to any number of bytes. In the striping mode, each packet is segmented (divided) into a number of smaller packet pieces that are transferred simultaneously using multiple lanes. In an embodiment of the present invention, the number of lanes is four. Segmented packet pieces may be stored in first-in first out memories (FIFOs) to adapt to the switch bandwidth.

Figure 6:
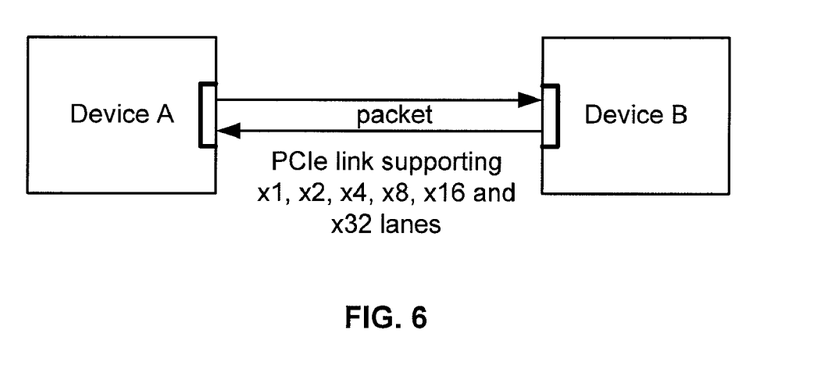
FIG. 6 shows two PCIe devices exchanging data packets across multiple lanes of a PCIe link, under an embodiment.

The striper of an embodiment parses data packets to determine their type and payload length, and splits packets with payload length that exceeds a predetermined number of bytes into smaller packets, as described above. The striper routes the small packets across channels of the switch fabric. Generally, in describing the switch fabric, FIG. 6 shows two PCIe devices exchanging data packets across multiple lanes of a PCIe link, under an embodiment. The link can be scaled by adding signal pairs to form multiple lanes, and the PCI Express Base Specification supports x1, x2, x4, x8, x16 and x32 lane widths. Once the two devices at each end of the link negotiate the lane widths and data rates, the byte data stream is striped and transmitted across the lanes.

Figure 7:
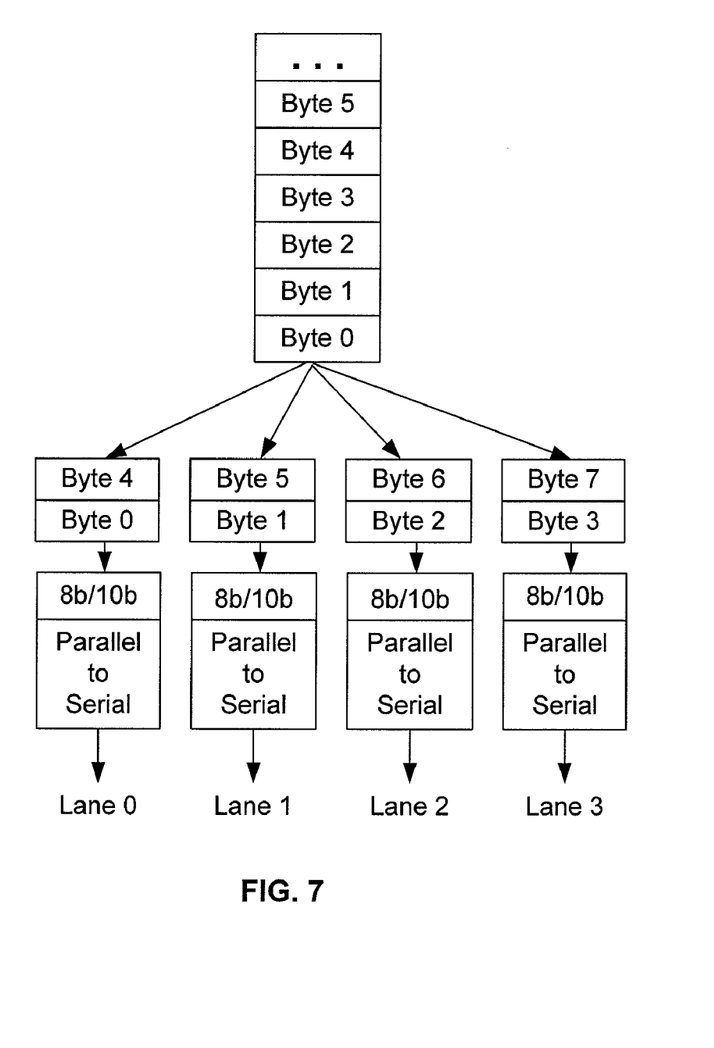
FIG. 7 shows data byte transmission across four lanes in a striping arrangement, under an embodiment.

FIG. 7 shows data byte transmission across four lanes in a striping arrangement, under an embodiment. Under the striping transmission scheme, Byte0, Byte1, Byte2, and Byte3 are each individually 8b/10 encoded, and the four encoded signals (10 bits) are serially converted to a 1-bit stream and sent out to Lane0, Lane1, Lane2, and Lane3, respectively. The following bytes, Byte4, Byte5, Byte6, and Byte7, are similarly striped and sent out to Lane0, Lane1, Lane 2, and Lane3, respectively; this process continues until the complete packet is transmitted. The four parallel bit streams on Lanes 0-3 are received at the other end, reassembled back to the four 10 parallel bits, 8b/10b decoded, and reassembled back to the origin data bytes. The striping and transmission process is transparent to the higher layers.

Figure 8:
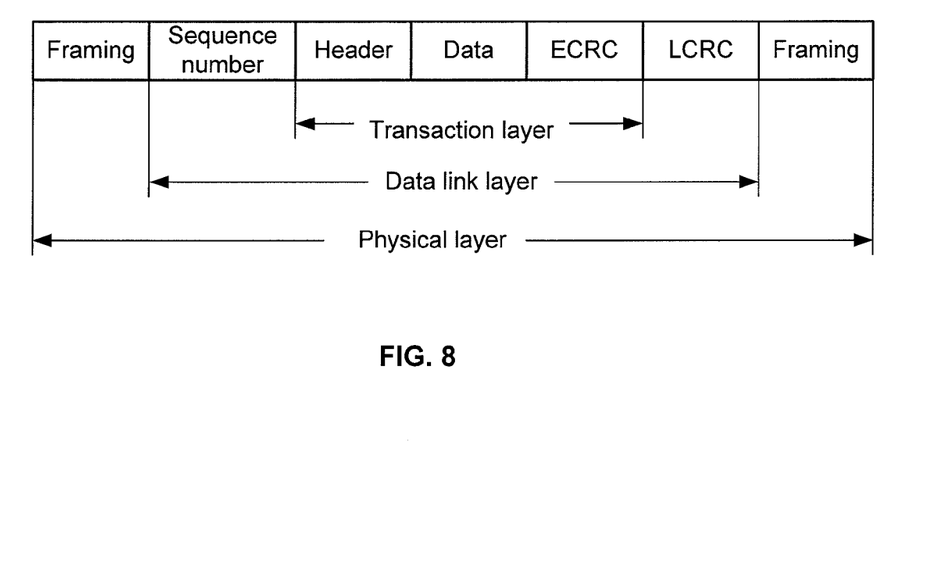
FIG. 8 is a block diagram of a PCIe packet frame structure.

FIG. 8 is a block diagram of a PCIe packet frame structure. Packets are initiated at the transaction layer. The transaction layer receives read and write requests from the software layer and creates packets for transmission to the link layer. Each packet has a unique destination identifier (ID) in order for the packet to be directed to the correct destination. Each packet also has a unique source ID that enables response packets to be directed to the originator. The source ID, destination ID, the packet type (request packets, completion packets, 32-bit or 64-bit addressable request packets) and the length of the data field (payload) and other relevant information are contained in the header field. The data field contains information to be transmitted. The number of bytes contained in the data field may vary dependent on the protocols and the packet type. The data link layer is responsible for data integrity and adds a sequence number and a CRC (LCRC) to the transaction layer packet. The physical layer attaches a framing pattern at both ends of the packet, and performs the data striping according to the negotiated lane bandwidth and the 8/10b encoding and bit-conversion described above.

The embodiments described herein include a system comprising: a plurality of network switches each comprising a plurality of channels; a plurality of scaling devices, wherein each scaling device of the plurality of scaling devices is coupled between at least one network switch of the plurality of network switches and a network device of a plurality of network devices; and a controller coupled to the plurality of scaling devices.

A first scaling device of an embodiment divides an original packet received from a first network device into a plurality of packet pieces if a payload length of a received packet is greater than a predetermined number of bytes.

The first scaling device of an embodiment transmits the packet pieces to a second scaling device using the plurality of channels.

The second scaling device of an embodiment reassembles the packet pieces to form the original packet at the second scaling device.

Each scaling device of an embodiment comprises a packet segmenter and a packet reassembler.

The packet segmenter of an embodiment divides a received packet from the network device into a plurality of packet pieces if a payload length of a received packet is greater than a predetermined number of bytes. The predetermined number of bytes of an embodiment is programmable.

The packet segmenter of an embodiment is bypassed if a payload length of a received packet is equal to or less than a predetermined number of bytes. The predetermined number of bytes of an embodiment is programmable.

Each scaling device of an embodiment comprises a plurality of egress first-in-first-out (FIFO) buffers.

Each scaling device of an embodiment comprises a plurality of ingress FIFO buffers.

The plurality of ingress FIFO buffers and egress FIFO buffers of an embodiment are configurable to adapt to control the traffic flow of different packet types.

Each scaling device of an embodiment comprises at least one PCIe high-speed lane coupled to the at least one network switch.

The at least one PCIe high-speed lane of an embodiment comprises a configurable transfer data rate.

The network device of an embodiment is a PCIe device.

Each scaling device of an embodiment comprises a PCIe port coupled to the PCIe device.

The PCIe port of an embodiment is configurable to include a plurality of lanes.

The network device of an embodiment is a PCIe endpoint device having at least one input/output (I/O) component, the at least one I/O component including at least one of a GbE I/O adapter, a 10 Gb Ethernet adapter, a Fibre Channel host bus adapter, and an InfiniBand host channel adapter.

A number of the plurality of channels of an embodiment is at least equal to the number of the plurality of network devices.

The bandwidth of the plurality of channels of an embodiment is at least equal the bandwidth of the plurality of network devices for a non-blocking packet transfer.

The embodiments described herein include a device comprising: a port and a plurality of channels, the port coupled to a network device, the plurality of channels coupled to a plurality of network switches; a packet segmenter coupled to the port; a plurality of egress first-in-first-out (FIFO) buffers coupled to the packet segmenter and the channels; a packet reassembler coupled to the port; and a plurality of ingress FIFO buffers coupled to the channels and the packet reassembler.

The packet segmenter of an embodiment divides a received packet from the network device into a plurality of packet pieces if a payload length of a received packet is greater than a predetermined number of bytes. The predetermined number of bytes of an embodiment is programmable.

The device of an embodiment comprises a bypass line coupled between the channels and the port, wherein the packet segmenter is bypassed via the bypass line if a payload length of a received packet is equal to or less than a predetermined number of bytes. The predetermined number of bytes of an embodiment is programmable.

The plurality of ingress FIFO buffers and egress FIFO buffers of an embodiment are configurable to adapt to control the traffic flow of different packet types.

The channels of an embodiment comprise a configurable transfer data rate.

The network device of an embodiment is a PCIe device.

The port of an embodiment comprises a PCIe port coupled to the PCIe device.

The PCIe port of an embodiment is configurable to include a plurality of lanes.

The network device of an embodiment is a PCIe endpoint device having at least one input/output (I/O) component, the at least one I/O component including at least one of a GbE I/O adapter, a 10 Gb Ethernet adapter, a Fibre Channel host bus adapter, and an InfiniBand host channel adapter.

The embodiments described herein include a method comprising: receiving a packet at a source striper, the packet transmitted from a source device corresponding to the source striper; determining a payload length of the packet received at the source striper; splitting the packet into a plurality of segments when the payload length is greater than a predetermined value; transmitting the plurality of segments to a destination stripper via a plurality of channels, wherein each channel is coupled to a switch fabric; regenerating the packet at a destination striper by reassembling the plurality of segments; and forwarding the packet to a destination device coupled to the destination striper.

The method of an embodiment comprises controlling the transmitting of the plurality of segments to a destination stripper according to a type of the packet.

The method of an embodiment comprises forwarding the packet to the switch fabric when the payload length is one of equal to and less than the predetermined value.

The method of an embodiment comprises controlling the transmitting of the packet to the switch fabric according to a type of the packet.

The method of an embodiment comprises forwarding the packet to the destination device.

The method of an embodiment comprises storing the plurality of segments at the source striper if the switch fabric is unable to receive the plurality of segments.

The method of an embodiment comprises forwarding the plurality of segments from the source striper if the switch fabric is able to receive the plurality of segments.

Forwarding of the packet to the destination device of an embodiment begins prior to completion of the regenerating of the packet at the destination striper by reassembling the plurality of segments.

The embodiments described herein include a method comprising: coupling a striper between a network device and a switch fabric; receiving a packet at the striper, the packet transmitted from the network device; determining a payload length of the packet received at the striper; splitting the packet into a plurality of segments when the payload length is greater than a predetermined value; and transmitting the plurality of segments to a destination stripper via the switch fabric.

The method of an embodiment comprises storing the plurality of segments at the striper if the switch fabric is unable to receive the plurality of segments.

The method of an embodiment comprises regenerating the packet at a destination striper by reassembling the plurality of segments, and forwarding the packet to a destination device coupled to the destination striper.

The method of an embodiment comprises forwarding the packet to the switch fabric when the payload length is one of equal to and less than the predetermined value.

The embodiments described herein include a method comprising: coupling a striper between a network device and a switch fabric; receiving a plurality of packet segments at the striper, the plurality of packet segments transmitted via a switch fabric from a source device; regenerating a packet at the striper by reassembling the plurality of packet segments, wherein a source striper corresponding to the source device split the packet to form the plurality of packet segments in response to a payload length of the packet exceeding a predetermined value; and forwarding the packet to the network device.

The method of an embodiment comprises: receiving a second packet at the striper, the second packet transmitted from the network device; determining a payload length of the second packet; splitting the second packet into a second plurality of packet segments when the payload length of the second packet is greater than a second predetermined value; and transmitting the second plurality of packet segments via the switch fabric.

The method of an embodiment comprises forwarding the second packet to the switch fabric when the payload length is one of equal to and less than the second predetermined value.

The method of an embodiment comprises storing the second plurality of packet segments at the striper if the switch fabric is unable to receive the plurality of packet segments.

The embodiments described herein improve lane efficiency of existing switch fabric by providing system scalability combined with the reduction of the required number of switches. Based on the segmentation of the transmitted packet using the striper described herein, the switch fabric becomes non-blocking, and together with the cut-though mechanism of the destination striper that starts sending the partially assembled packet to the destination device, reduces system latency.

Networks suitable for use with the embodiments described herein include local area networks (LAN), wide area networks (WAN), Internet, or other connection services and network variations such as the world wide web, the public internet, a private internet, a private computer network, a public network, a mobile network, a cellular network, a value-added network, and the like. Computing devices coupled or connected to the network may be any microprocessor controlled device that permits access to the network, including terminal devices, such as personal computers, workstations, servers, mini computers, main-frame computers, laptop computers, mobile computers, palm top computers, hand held computers, mobile phones, TV set-top boxes, or combinations thereof. The computer network may include one of more LANs, WANs, Internets, and computers. The computers may serve as servers, clients, or a combination thereof.

The striper can be a component of a single system, multiple systems, and/or geographically separate systems. The striper can also be a subcomponent or subsystem of a single system, multiple systems, and/or geographically separate systems. The striper can be coupled to one or more other components (not shown) of a host system or a system coupled to the host system.

One or more components of the striper and/or a corresponding system or application to which the striper is coupled or connected include and/or run under and/or in association with a processing system. The processing system includes any collection of processor-based devices or computing devices operating together, or components of processing systems or devices, as is known in the art. For example, the processing system can include one or more of a portable computer, portable communication device operating in a communication network, and/or a network server. The portable computer can be any of a number and/or combination of devices selected from among personal computers, personal digital assistants, portable computing devices, and portable communication devices, but is not so limited. The processing system can include components within a larger computer system.

The processing system of an embodiment includes at least one processor and at least one memory device or subsystem. The processing system can also include or be coupled to at least one database. The term "processor" as generally used herein refers to any logic processing unit, such as one or more central processing units (CPUs), digital signal processors (DSPs), application-specific integrated circuits (ASIC), etc. The processor and memory can be monolithically integrated onto a single chip, distributed among a number of chips or components, and/or provided by some combination of algorithms. The methods described herein can be implemented in one or more of software algorithm(s), programs, firmware, hardware, components, circuitry, in any combination.

The components of any system that includes the striper can be located together or in separate locations. Communication paths couple the components and include any medium for communicating or transferring files among the components. The communication paths include wireless connections, wired connections, and hybrid wireless/wired connections. The communication paths also include couplings or connections to networks including local area networks (LANs), metropolitan area networks (MANs), wide area networks (WANs), proprietary networks, interoffice or backend networks, and the Internet. Furthermore, the communication paths include removable fixed mediums like floppy disks, hard disk drives, and CD-ROM disks, as well as flash RAM, Universal Serial Bus (USB) connections, RS-232 connections, telephone lines, buses, and electronic mail messages.

Aspects of the striper and corresponding systems and methods described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the striper and corresponding systems and methods include: microcontrollers with memory (such as electronically erasable programmable read only memory (EEPROM)), embedded microprocessors, firmware, software, etc. Furthermore, aspects of the striper and corresponding systems and methods may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

It should be noted that any system, method, and/or other components disclosed herein may be described using computer aided design tools and expressed (or represented), as data and/or instructions embodied in various computer-readable media, in terms of their behavioral, register transfer, logic component, transistor, layout geometries, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, etc.). When received within a computer system via one or more computer-readable media, such data and/or instruction-based expressions of the above described components may be processed by a processing entity (e.g., one or more processors) within the computer system in conjunction with execution of one or more other computer programs.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import, when used in this application, refer to this application as a whole and not to any particular portions of this application. When the word "or" is used in reference to a list of two or more items, that word covers all of the following interpretations of the word: any of the items in the list, all of the items in the list and any combination of the items in the list.

The above description of embodiments of the striper and corresponding systems and methods is not intended to be exhaustive or to limit the systems and methods to the precise forms disclosed. While specific embodiments of, and examples for, the striper and corresponding systems and methods are described herein for illustrative purposes, various equivalent modifications are possible within the scope of the systems and methods, as those skilled in the relevant art will recognize. The teachings of the striper and corresponding systems and methods provided herein can be applied to other systems and methods, not only for the systems and methods described above.

The elements and acts of the various embodiments described above can be combined to provide further embodiments. These and other changes can be made to the striper and corresponding systems and methods in light of the above detailed description.

In general, in the following claims, the terms used should not be construed to limit the striper and corresponding systems and methods to the specific embodiments disclosed in the specification and the claims, but should be construed to include all systems that operate under the claims. Accordingly, the striper and corresponding systems and methods is not limited by the disclosure, but instead the scope is to be determined entirely by the claims. While certain aspects of the striper and corresponding systems and methods are presented below in certain claim forms, the inventors contemplate the various aspects of the striper and corresponding systems and methods in any number of claim forms. Accordingly, the inventors reserve the right to add additional claims after filing the application to pursue such additional claim forms for other aspects of the striper and corresponding systems and methods.

What is claimed is:

1. A system comprising:
a switching fabric comprising a plurality of interface lanes coupled to a plurality of network switches;
a plurality of scaling devices, wherein each scaling device of the plurality of scaling devices is coupled between the switching fabric and a network endpoint device of a plurality of network endpoint devices; and
wherein a scaling device of the plurality of scaling devices comprises:
a plurality of egress first-in-first-out (FIFO) buffers corresponding to a plurality of attached lanes of the plurality of interface lanes, each egress FIFO buffer coupled to a packet segmenter and a particular lane of the plurality of attached lanes;
the packet segmenter configured to segment an original packet received from the network endpoint device into a plurality of packet segments and distribute the plurality of packet segments to the plurality egress first-in-first-out (FIFO) buffers and thereby stripe the original packet across the plurality of attached lanes.

2. The system of claim 1, wherein the plurality of attached lanes are coupled to a corresponding plurality of coupled network switches of the plurality of network switches.

3. The system of claim 1, wherein a first scaling device individually transmits the plurality of packet segments to a second scaling device using the plurality of attached lanes.

4. The system of claim 3, wherein the second scaling device reassembles the plurality of packet segments to form the original packet at the second scaling device.

5. The system of claim 1, wherein each scaling device further comprises a packet reassembler.

6. The system of claim 1, wherein the packet segmenter segments the original packet from the network endpoint device into the plurality of segments if a payload length of the original packet is greater than a predetermined number of bytes.

7. The system of claim 6, wherein the predetermined number of bytes is programmable.

8. The system of claim 1, wherein the packet segmenter is bypassed if a payload length of the original packet is equal to or less than a predetermined number of bytes.

9. The system of claim 8, wherein the predetermined number of bytes is programmable.

10. The system of claim 1, wherein each scaling device comprises a plurality of egress first-in-first-out (FIFO) buffers.

11. The system of claim 10, wherein each scaling device comprises a plurality of ingress FIFO buffers.

12. The system of claim 11, wherein the plurality of ingress FIFO buffers and egress FIFO buffers are configurable to adapt to control the traffic flow of different packet types.

13. The system of claim 1, wherein each scaling device comprises at least one Peripheral Component Interconnect Express (PCIe) high-speed lane coupled to the at least one network switch.

14. The system of claim 13, wherein the at least one PCIe high-speed lane comprises a configurable transfer data rate.

15. The system of claim 1, wherein the network endpoint device is a PCIe device.

16. The system of claim 15, wherein each scaling device comprises a PCIe port coupled to the PCIe device.

17. The system of claim 15, wherein the network endpoint device is a PCIe endpoint device having at least one input/output (I/O) component, the at least one I/O component including at least one of a GbE I/O adapter, a 10 Gb Ethernet adapter, a Fibre Channel host bus adapter, and an InfiniBand host channel adapter.

18. The system of claim 1, wherein the bandwidth of the plurality of lanes is at least equal to a bandwidth of the plurality of network endpoint devices for a non-blocking packet transfer.

19. A device for striping packets, the device comprising:
an endpoint port configured to receive a packet from an endpoint device;
a plurality of fabric ports for connecting to lanes of a switching fabric;
a packet segmenter coupled to the endpoint port;
a plurality of egress first-in-first-out (FIFO) buffers corresponding to the plurality of fabric ports, each egress FIFO buffer coupled to the packet segmenter and a particular fabric port of the plurality of fabric ports; and
the packet segmenter configured to segment an original packet received from the network endpoint device into a plurality of packet segments and distribute the plurality of packet segments to the plurality of egress first-in-first-out (FIFO) buffers and thereby stripe the original packet across the plurality of fabric ports.

20. The device of claim 19, wherein the packet segmenter divides a received packet into the plurality of segments if a payload length of a received packet is greater than a predetermined number of bytes.

21. The device of claim 20, wherein the predetermined number of bytes is programmable.

22. The device of claim 19, comprising a bypass line coupled between the plurality of fabric ports and the endpoint port, wherein the packet segmenter is bypassed via the bypass line if a payload length of a received packet is equal to or less than a predetermined number of bytes.

23. The device of claim 22, wherein the predetermined number of bytes is programmable.

24. The device of claim 19, wherein the plurality of egress FIFO buffers are configurable to adapt to control the traffic flow of different packet types.

25. The device of claim 19, wherein the plurality of fabric ports comprise a configurable transfer data rate.

26. The device of claim 19, wherein the endpoint port is coupled to a PCIe device.

27. The device of claim 26, wherein the endpoint port comprises a PCIe port coupled to the PCIe device.

28. The device of claim 27, wherein the PCIe port is configurable to include a plurality of lanes.

29. The device of claim 19, wherein the endpoint device is a PCIe endpoint device having at least one input/output (I/O)

component, the at least one I/O component including at least one of a GbE I/O adapter, a 10 Gb Ethernet adapter, a Fibre Channel host bus adapter, and an InfiniBand host channel adapter.

30. A method comprising:
coupling a source striper between a source endpoint device and a switch fabric comprising a plurality of interface lanes coupled to a plurality of network switches;
receiving a packet at the source striper, the packet transmitted from the source endpoint device corresponding to the source striper;
determining a payload length of the packet received at the source striper;
splitting the packet into a plurality of segments when the payload length is greater than a predetermined value;
individually transmitting the plurality of segments to a destination stripper via a first set of attached lanes of the plurality of interface lanes, wherein the destination striper is coupled between the switch fabric and a destination endpoint device via a second set of attached lanes of the plurality of interface lanes;
regenerating the packet at a the destination striper by reassembling the plurality of segments; and
forwarding the packet to the destination endpoint device.

31. The method of claim 30, comprising controlling the transmitting of the plurality of segments to the destination stripper according to a type of the packet.

32. The method of claim 30, comprising forwarding the packet to the switch fabric when the payload length is one of equal to and less than the predetermined value.

33. The method of claim 32, comprising controlling the transmitting of the packet to the switch fabric according to a type of the packet.

34. The method of claim 32, comprising forwarding the packet to the destination endpoint device.

35. The method of claim 30, comprising storing the plurality of segments at the source striper if the switch fabric is unable to receive the plurality of segments.

36. The method of claim 30, comprising forwarding the plurality of segments from the source striper if the switch fabric is able to receive the plurality of segments.

37. The method of claim 30, wherein forwarding of the packet to the destination endpoint device begins prior to completion of the regenerating of the packet at the destination striper by reassembling the plurality of segments.

38. A method comprising:
coupling a striper between a network endpoint device and a switch fabric;
receiving a packet at the striper, the packet transmitted from the network endpoint device;
determining a payload length of the packet received at the striper;
splitting the packet into a plurality of segments when the payload length is greater than a predetermined value; and
individually transmitting the plurality of segments to a destination striper via the switch fabric.

39. The method of claim 38, comprising storing the plurality of segments at the striper if the switch fabric is unable to receive the plurality of segments.

40. The method of claim 38, comprising:
regenerating the packet at a destination striper by reassembling the plurality of segments; and
forwarding the packet to a destination endpoint device coupled to the destination striper.

41. The method of claim 38, comprising forwarding the packet to the switch fabric when the payload length is one of equal to and less than the predetermined value.

42. A method comprising:
coupling a striper between a network endpoint device and a switch fabric;
receiving a first plurality of packet segments at the striper, the first plurality of packet segments transmitted via a switch fabric from a source endpoint device;
regenerating a first packet at the striper by reassembling the first plurality of packet segments, wherein a source striper corresponding to the source endpoint device split the first packet to form the first plurality of packet segments in response to a payload length of the first packet exceeding a first predetermined value; and
forwarding the first packet to the network endpoint device.

43. The method of claim 42, comprising:
receiving a second packet at the striper, the second packet transmitted from the network endpoint device;
determining a payload length of the second packet;
splitting the second packet into a second plurality of packet segments when the payload length of the second packet is greater than a second predetermined value; and
individually transmitting the second plurality of packet segments via the switch fabric.

44. The method of claim 43, comprising forwarding the second packet to the switch fabric when the payload length is one of equal to and less than the second predetermined value.

45. The method of claim 43, comprising storing the second plurality of packet segments at the striper if the switch fabric is unable to receive the second plurality of packet segments.

* * * * *